United States Patent [19]

Antonevich

[11] 4,007,119
[45] Feb. 8, 1977

[54] METHODS AND APPARATUS FOR SKIMMING LIQUIDS

[75] Inventor: John N. Antonevich, Jamestown, N.Y.

[73] Assignee: Blackstone Corporation, Jamestown, N.Y.

[22] Filed: Sept. 9, 1975

[21] Appl. No.: 611,720

[52] U.S. Cl. .............................. 210/65; 210/523; 266/228
[51] Int. Cl.² ........................................ B01D 37/00
[58] Field of Search .............. 210/83, 84, 523, 525, 210/527, 528, 65; 75/24; 266/227, 228, 37; 209/168–170; 228/31, 36, 56

[56] References Cited

UNITED STATES PATENTS

| | | | |
|---|---|---|---|
| 2,363,885 | 11/1944 | McKleen | 210/523 |
| 3,447,683 | 6/1969 | Luce, Jr. | 210/83 |
| 3,612,388 | 10/1971 | Wegener et al. | 228/36 X |
| 3,877,110 | 4/1975 | McCloskey et al. | 209/173 X |

Primary Examiner—Frank W. Lutter
Assistant Examiner—William A. Cuchlinski, Jr.
Attorney, Agent, or Firm—Buell, Blenko & Ziesenheim

[57] ABSTRACT

A method and apparatus for skimming liquids such as solder are provided for removing the surface layer to produce a clean fresh surface by breaking the surface at two parallel spaced confining boundaries and moving the confined surface unidirectionally.

2 Claims, 3 Drawing Figures

METHODS AND APPARATUS FOR SKIMMING LIQUIDS

This invention relates to methods and apparatus for skimming liquids and particularly to a method and apparatus for producing continuously a fresh surface on molten metals with a minimum of agitation of the liquid.

The problems of skimming liquids such as molten solder having high surface tension and a thin surface layer of oxides, dross or floating contaminates is well known. Many methods and apparatus have been tried for this purpose without producing a simple, inexpensive method and apparatus.

One of the best known and most difficult of such liquids requiring skimming is the molten solder bath used in automated production lines for dip soldering. This invention will, accordingly, be described in connection with a dip solder pot for such a line.

In automated production lines for dip soldering a method of removing surface oxides, dross formations and floating contaminants and debris is essential to assure consistent and repeated results each time a part is dipped for soldering. In high temperature and high surface temperature solders such as zinc base solders the practice of continuous pumping and cascading of solder over a confining wall generally used in an effort to provide a skimming and cleaning action is not effective in causing the solder surface layer to move and produce a clean solder surface. The problem appears to lie in the fact that because of the high surface tension, the solder surface remains attached to the boundaries and moving solder flows beneath this surface layer leaving the surface intact and unbroken. Recourse to paddles mechanically sweeping the surface layer from the solder pot is effective but must be slow and thus requires appreciable time in order to avoid solder splashing. Experience with this form of skimmer has shown that rapid sweeps of the paddles causes excessive undesirable splashing. The problem of skimming the solder surface is even more acute in the case of ultrasonic fluxless soldering or brazing, as for example in soldering or brazing large aluminum parts, because oxide removal from the parts is appreciable and thus the surface layer of contaminants builds up quickly. Repeated dipping of parts in these oxide surface layers results in poor quality solder or braze joints. Conventional skimmer paddles sweeping a length of one to five feet in a few seconds is non-feasible. Moreover such paddle arrangements are prone to failure due to cyclic stresses. Surface skimming of the molten solder by cascading the molten solder over a confining wall is not only ineffective but it erodes or dissolves pumps and containing members leading to rapid failure of these parts and contamination of the soldering system. Moreover, in such ultrasonic fluxless dip solder pots, gross agitation by paddles or continuous gross flow of solder will in many cases render the solder pot ineffective by distorting the ultrasonic field.

I have developed a skimming apparatus which removes the surface layer and produces a clean, fresh surface by breaking the surface at two parallel confining boundaries and moving the confined surface unidirectionally. In a preferred practice of my invention I cyclically break the surface layer of liquid at two spaced apart parallel confining boundaries, preferably parallel to the two longest opposite sidewalls of the solder pot, and move the confining boundaries unidirectionally toward one of said longest sidewalls causing the surface contaminants to pile up between said one sidewall and the adjacent moving boundary. Preferably I provide a pair of spaced parallel blades whose motions are synchronized to enter the surface layer, move across it and leave the surface layer substantially simultaneously and in parallel.

In the foregoing general description of my invention I have set out certain objects, purposes and advantages of my invention. Other objects, purposes and advantages of my invention will be apparent from a consideration of the following description and the accompanying drawings in which.

Figure 1:
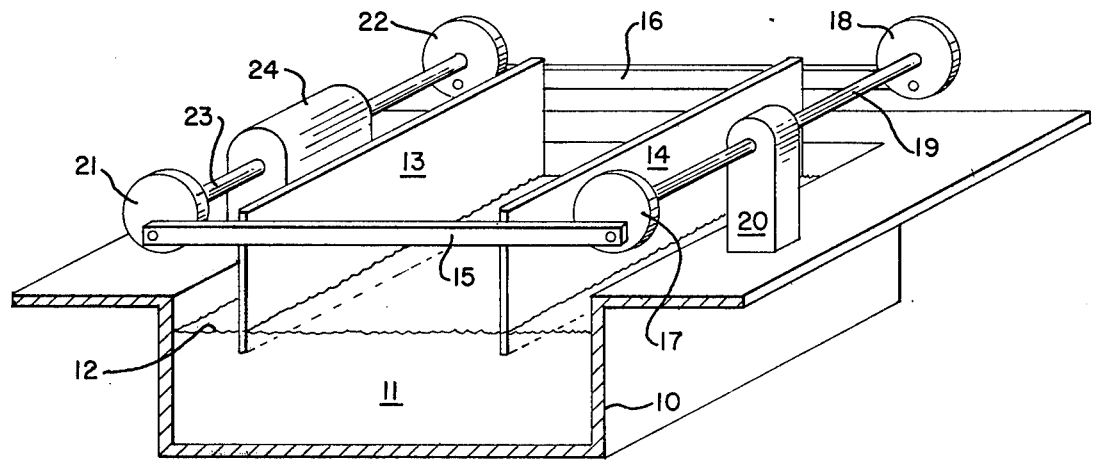
FIG. 1 is an isometric view of a preferred apparatus of my invention.

Referring to the drawings I have illustrated a solder pot 10 containing a molten bath of solder 11 having a surface layer 12 of dross, contaminants and the like. A pair of spaced apart parallel blades 13 and 14 are fixed at their ends on parallel crank arms 15 and 16 so that the blades 13 and 14 are generally parallel to the long sidewalls of the pot 10. Crank arms 15 and 16 are journalled at one end on cranks 17 and 18 on shaft 19 freely rotatable in support member 20 adjacent one long side of the solder pot. The other end of crank arms 15 and 16 are journalled on cranks 21 and 22 on opposite ends of drive shaft 23 driven by motor 24 adjacent the other long side of the solder pot.

In operation the blades 13 and 14 enter the molten solder 11, passing through the surface layer 12 and, assuming counterclockwise rotation of motor 24 viewing FIG. 1, move to the right carrying the surface layer contained between them toward the right. The two blades then are lifted from the bath surface in unison, moved to the left viewing FIG. 1 and again inserted into the bath. This cyclical movement causes the dross and contaminants to be moved to the right sidewall and be piled up there from which they can be readily removed, and maintains a generally clean surface between the two blades into which an article may be dipped.

Figure 2:
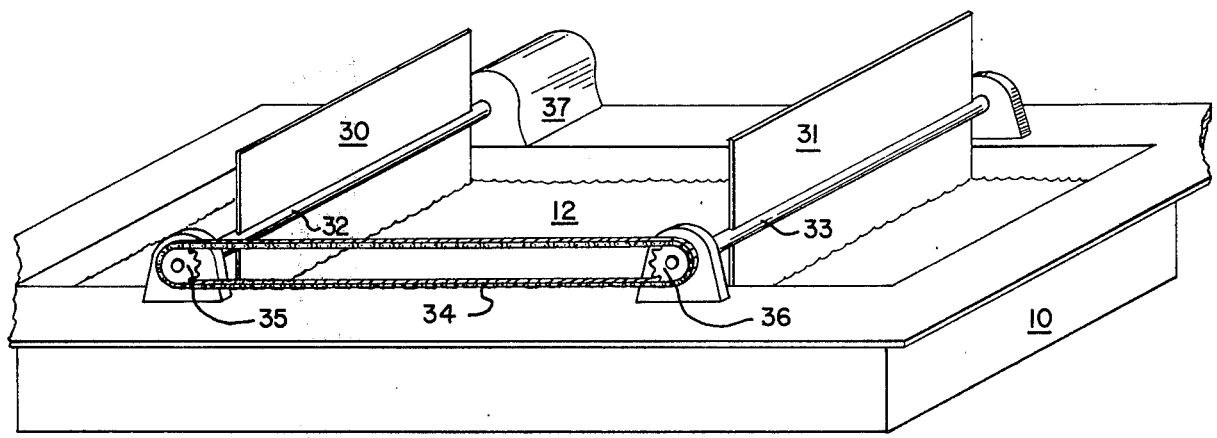
FIG. 2 is an isometric view of a second embodiment of apparatus of my invention.

In FIG. 2 I have illustrated a second embodiment of this invention in which rotating flat blades 30 and 31 on spaced parallel shafts 32 and 33 are substituted for blades 13 and 14 of the embodiment of FIG. 1. The shafts 32 and 33 are operatively connected by chain 34 and sprockets 35 and 36 and shaft 32 is driven by motor 37. The two blades 30 and 31 enter the surface of the bath in parallel and in unison and, when rotating in the counterclockwise direction, move the surface layer to the right as in the embodiment of FIG. 1.

Figure 3:
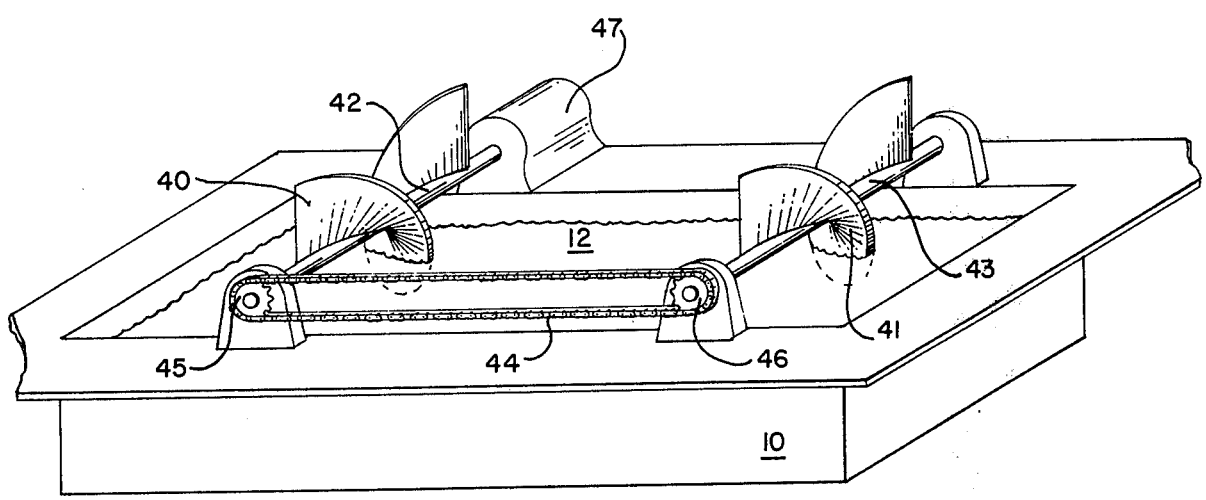
FIG. 3 is an isometric view of a third embodiment of apparatus of my invention.

In FIG. 3 I have illustrated a third embodiment using a pair of identical spaced spiral blades 40 and 41 on parallel shafts 42 and 43 operatively connected by chain 44 and sprockets 45 and 46 and driven by motor 47. The edges of blades 40 and 41 are parallel so that they enter the bath surface, move across the surface and leave the surface in parallel, carrying with them the portion of surface layer between them.

In the foregoing specification, I have set out certain preferred practices and embodiments of my invention, however, it will be understood that this invention may be otherwise embodied within the scope of the following claims.

I claim:
1. A method of surface skimming liquids such as molten solder comprising the steps of:
   a. breaking the surface at two spaced parallel confining boundaries;
   b. moving the confined surface unidirectionally;
   c. removing the confining boundaries; and
   d. continuously repeating steps (a) through (c), said surface being broken by inserting a pair of spaced parallel blades which are moved in synchronism across the surface, removed, returned to their entry point and reinserted in the liquid in cyclic fashion.

2. An apparatus for skimming liquids in a confining pot comprising a pair of spaced parallel blades and means cyclically and synchronously driving said blades simultaneously to enter said liquid through the top surface in parallel, move across said liquid with a portion of the surface confined therebetween and rise from the surface at a point spaced from their entry a pair of spaced parallel shafts journalled adjacent the confining pot, cranks on each end of each shaft, crank arms interconnecting the cranks on each end of said shafts, said spaced parallel blades mounted on said crank arms and drive means synchronously driving said shafts.

* * * * *